April 28, 1964 H. NERWIN Re. 25,563

AUTOMATIC EXPOSURE CONTROL SYSTEM

Original Filed Dec. 5, 1958 3 Sheets-Sheet 1

Hubert Nerwin
INVENTOR.
BY R. Frank Smith
Robert W. Hampton
ATTORNEYS

AUTOMATIC EXPOSURE CONTROL SYSTEM

Original Filed Dec. 5, 1958 3 Sheets-Sheet 2

Hubert Nerwin
INVENTOR.
R. Frank Smith
BY
Robert W. Hampton
ATTORNEYS

AUTOMATIC EXPOSURE CONTROL SYSTEM

Original Filed Dec. 5, 1958 3 Sheets-Sheet 3

Hubert Nerwin
INVENTOR.
BY R. Frank Smith
Robert W. Hampton
ATTORNEYS

United States Patent Office

Re. 25,563
Reissued Apr. 28, 1964

25,563

AUTOMATIC EXPOSURE CONTROL SYSTEM

Hubert Nerwin, Rochester, N.Y., assignor to Eastman Kodak Company, Rochester, N.Y., a corporation of New Jersey Original No. 2,999,438, dated Sept. 12, 1961, Ser. No. 778,429, Dec. 5, 1958. Application for reissue June 14, 1963, Ser. No. 288,062

5 Claims. (Cl. 95—10)

Matter enclosed in heavy brackets [ ] appears in the original patent but forms no part of this reissue specification; matter printed in italics indicates the additions made by reissue.

The present invention concerns automatic exposure control systems in photographic cameras and more particularly concerns such control systems wherein both shutter speed and diaphragm aperture are variable and are automatically controlled.

In most prior art cameras having automatic exposure control systems, either the shutter speed or the diaphragm aperture is set automatically in response to some measurement of the intensity of light from the viewed scene. Where one of these exposure factors is set automatically it has been the practice either to maintain the other constant or to vary it manually. If one exposure factor remains constant, the range of exposure values for which the camera can be used is relatively limited. On the other hand, if the nonautomatic exposure factor must be varied manually, this defeats, a primary purpose of automatic exposure control systems, viz.; minimizing the effort required of the person operating the camera.

It is therefore a principal object of the present invention to automatically set both the shutter speed and the diaphragm opening of the camera as related functions of the intensity of light from a viewed scene. This object may be accomplished by energizing a moving coil electric instrument, or galvanometer, as a function of the intensity of light from the viewed scene, then setting both the shutter speed and the diaphragm opening in accordance with the degree of energization of the galvanometer.

A more particular object, in a camera having a moving coil that is positioned in accordance with the intensity of viewed light, is to simultaneously establish the diaphragm aperture and condition the shutter speed as related functions of the position of the moving coil, and then trigger the shutter, all in response to manual actuation of an operating lever.

Other objects of the invention will appear from the following description, reference being made to the accompanying drawings, wherein.

Figure 1:
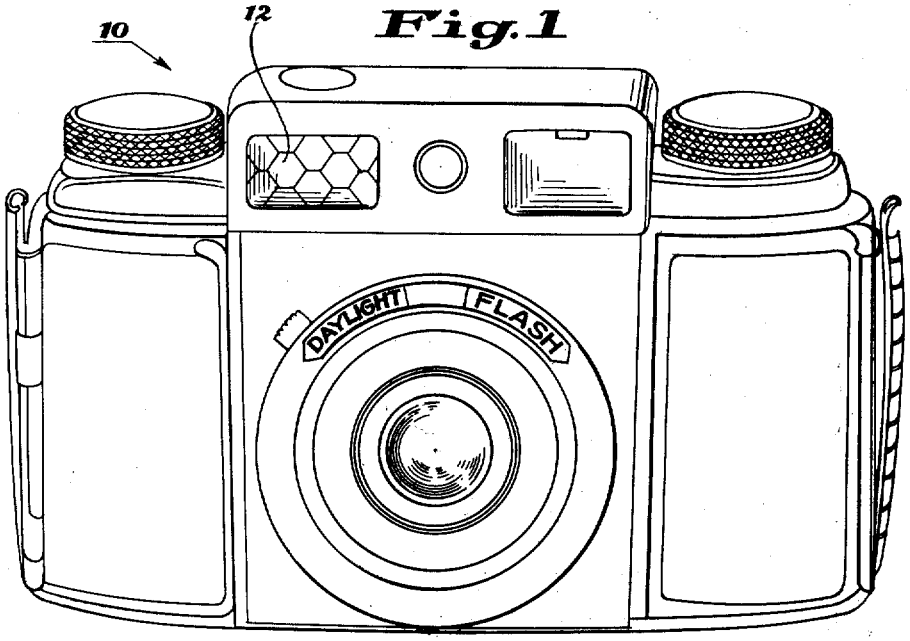
FIG. 1 is a front view of a still camera embodying the present invention.

A camera 10 (FIG. 1) is provided with a light-measuring instrument having a lens block 12 facing the scene that is to be photographed. The light-measuring instrument further includes a light-sensitive surface 13 (FIG. 4), which is connected to and energizes a galvanometer 14. The instrument circuit may be of any galvanometer type well known in the art, as described for example in U.S. Patent No. 2,528,716, or it may comprise a hot-wire actuator, a solenoid or other photoelectric-to-mechanical transducer. The galvanometer has a moving coil 16 that is angularly positioned as a function of the intensity of light from the viewed scene. An arm 18, which is integral with coil 16, rotates therewith and is employed to condition the shutter speed and to limit diaphragm opening in the manner described hereinafter.

The present invention is adapted for use with any multiple-speed pivoted-blade shutter, whether of the cocking or automatic type, wherein a moving element, as a function of its position, sets, conditions, or otherwise controls the operating speed of the shutter. To illustrate the invention, I have shown portions of a well-known type of cocking shutter wherein a speed ring 22 (FIG. 3) is mounted for rotation about a sleeve hub 24 that surrounds a fixed aperture 26, the latter being concentric with the lens axis of the camera. A cam slot 28 in the speed ring 22 cooperates with a pin 30 on a retard mechanism, indicated generally at 32 in FIG. 2. When ring 22 (FIG. 3) is rotated, cam 28 moves pin 30 radially to adjust the retard mechanism and thereby adjust the rate of movement with which a cocking ring 34 (FIG. 2) travels from its cocked position to its uncocked position. During this movement the cocking ring cooperates with a shutter-drive lever 36, pivoted at 38, to open and close a pair of shutter blades 40 and 42 at a speed determined by the initial setting of the speed ring 22 (FIG. 3). The operation of this type of shutter is well known to those skilled in the art. The entire shutter is disclosed in detail in Eastman Kodak Company Apparatus and Optical Division Service Manual No. 620, and the shutter is commercially available as a component of the Kodak Pony IV Camera.

Figure 2:
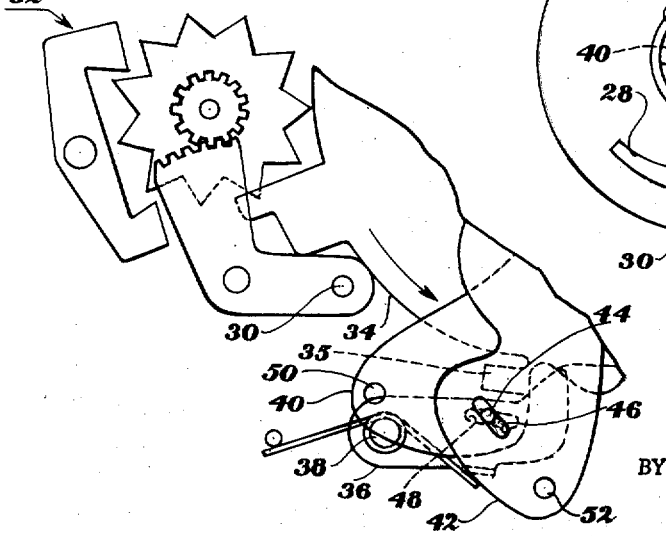
FIG. 2 is a front view of a portion of the shutter showing the retard mechanism and the shutter-drive lever.
Figure 3:
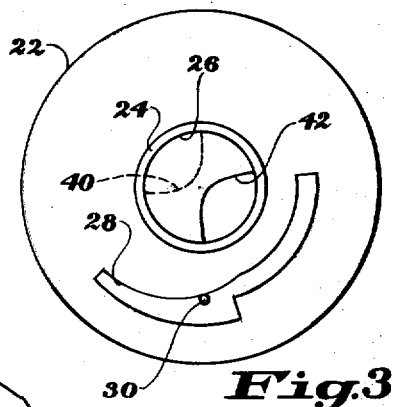
FIG. 3 is a front view of the shutter speed ring.

When the cocking ring 34 is released by tripping the shutter, it rotates in a counterclockwise direction as shown by the arrow in FIG. 2. An ear 35 on the cocking ring engages lever 36, and rocks it clockwise about pivot 38. A pin 44 on lever 36 extends through a respective oblong slot 46 and 48 in each of the shutter blades 40 and 42, which are pivoted at 50 and 52, respectively. Slots 46 and 48 are arranged at an angle to each other and at an angle to the reciprocating path of pin 44. Therefore, as pin 44 is reciprocated, blades 40 and 42, which initially overlap to cap aperture 26 (FIG. 3), are rocked back and forth in opposite directions about their pivots and temporarily uncap aperture 26.

Figure 4:
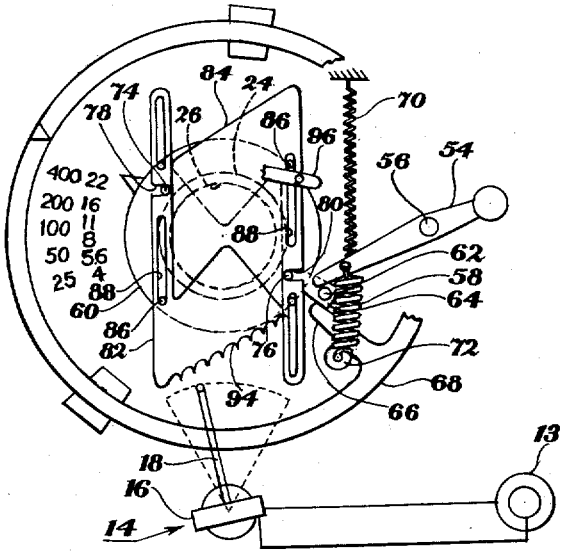
FIG. 4 is a front view of the diaphragm blades, the diaphragm drive ring and shutter-speed sensing ring showing their relation to the galvanometer and camera operating lever before the latter is depressed.
Figure 5:
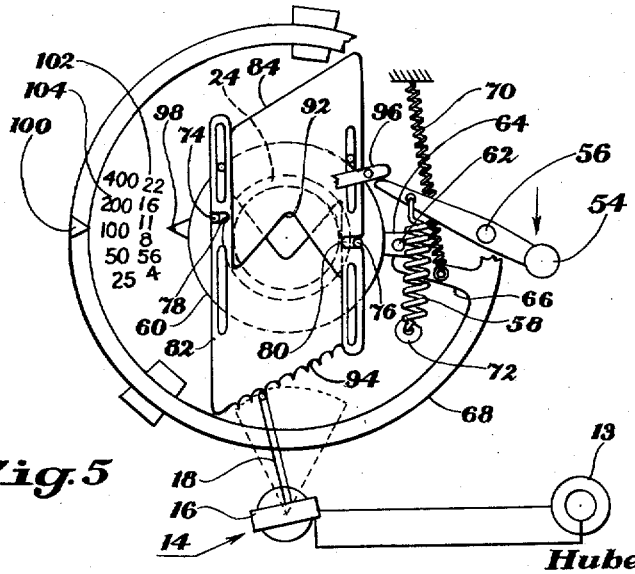
FIG. 5 is a front view of the mechanism shown in FIG. 4 after the camera operating lever is depressed.

The camera operating lever, shown at 54 in FIGS. 4 and 5, is pivoted at 56 and is urged counterclockwise by a spring 58. A diaphragm-drive ring 60 is mounted on hub 24 for rocking motion about the lens axis and has a pin 62 on an arm 64, which pin is engaged by lever 54 when the latter is in its counterclockwise position. Arm 64 engages an arm 66 of a shutter-speed sensing ring 68, which is integral with the shutter speed ring 22 (FIG. 3) and rocks therewith about the lens axis. Ring 68 is urged in a counterclockwise direction about the lens axis by a spring 70, which is lighter than spring 58. When lever 54 is in its released or counterclockwise position, abutting pin 62, it is driven by spring 58 against the tension of the lighter spring 70 to force rings 60 and 68 clockwise to a position where arm 66 engages a fixed stop 72.

Figure 6:
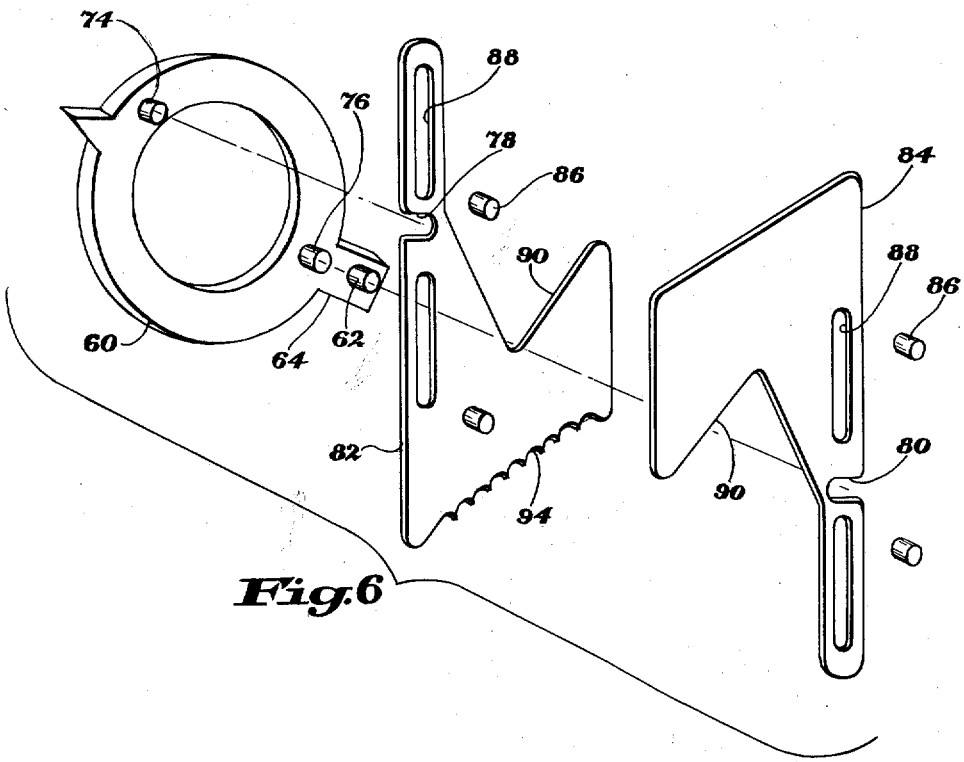
FIG. 6 is an exploded isometric view of the diaphragm blades and the diaphragm drive ring.

The diaphragm-drive ring 60 has a pair of pins 74 and 76, each of which extends out of the plane of the ring and into engagement with a slot 78 or 80 of a diaphragm vane 82 or 84, respectively. The diaphragm vanes are supported for opposed sliding movement by fixed pins, such as 86, engaging longitudinal slots, such as 88, in the vanes. Each vane has a central relieved area, such as 90 (FIG. 6), cooperating with the corresponding area of the other vane to form a diaphragm aperture 92 (FIG. 5)

when the two diaphragm vanes are moved apart. This movement is imparted to the diaphragm vanes by the interaction of pins 74 and 76 with the respective slots 78 and 80 when ring 60 is rocked in a counterclockwise direction, as described below, and is limited by the engagement of a serrated edge 94 of vane 82 with galvanometer arm 18. The edge 94 of vane 82 is slanted so that the less the energization of the galvanometer, and therefore the less counterclockwise that arm 18 is rocked, the further vane 82 travels before its edge 94 engages arm 18. Thus, aperture 92 is larger for smaller energizations of galvanometer 14 and is a function of the intensity of light from the viewed scene.

When the camera operating lever 54 is depressed manually, as shown in FIG. 5, thereby tensioning the heavier spring 58, the lighter spring 70 drives rings 60 and 68 counterclockwise to set the diaphragm aperture and shutter speed, both of which change until blade edge 94 engages the instrument arm 18 to thereby stop the counterclockwise movement of rings 60 and 68. Further manual depression of lever 54 trips a shutter trigger lever 96 to initiate shutter operation in the manner well known in the art.

The setting of diaphragm opening and shutter speed, at the time the shutter is triggered, may be indicated by a pair of pointers 98 and 100 (FIG. 5) on rings 60 and 68, and cooperating with fixed scales 102 and 104 showing diaphragm opening and shutter speed, respectively.

When the camera operating lever 54 is released following an exposure, it is rocked counterclockwise by spring 58 and engages pin 62 on ring 60, thereby rocking rings 60 and 68 clockwise against the tension of the weaker spring 70, until arm 66 on ring 68 engages the fixed stop 72. The camera is then prepared for a next exposure.

Figure 7:
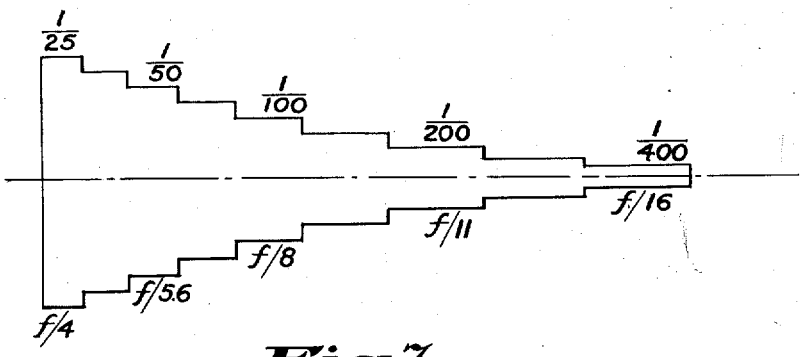
FIG. 7 is a graph showing the relation of the automatically selected shutter speeds and diaphragm openings.

It will have been observed that both the shutter speed and the diaphragm opening of a camera embodying the present invention are determined as functions of the light intensity from the viewed scene. Theoretically there are an infinite number of combinations of shutter speeds and diaphragm openings which will produce a "correct" exposure at any intensity of light from the viewed scene. Faster shutter speeds favor motion stopping whereas smaller diaphragm openings favor depth of field in the photograph. When the present invention is embodied in a particular camera, an arbitrary choice must be made as to the combination of shutter speed and diaphragm opening that will be produced in response to each setting of the galvanometer. In the illustrated embodiment of the invention, each serration on the edge 94 of vane 82 corresponds to a difference of one-half "stop" of diaphragm opening, relative to the adjacent serration. Also, each incremental counterclockwise movement of ring 68, where it is stopped by ring 60, corresponds to a change of one-half stop in shutter speed. Therefore, a distance of one serration on vane 82 in combination with one increment of counterclockwise movement of ring 68 corresponds to a full exposure stop or a factor of 2 in the intensity of light from the viewed scene. With minimum energization of galvanometer 14, arm 18 engages the rightmost serration of vane 82, corresponding for example to a shutter speed of 1/25 second and a diaphragm opening of f/4, respectively. The next serration on vane 82 corresponds to half-stop values, and the third serration corresponds to the next full stop values (1/50 second and f/5.6 in this case. Since both shutter speed and diaphragm opening are changed in the same direction, i.e., toward greater or less exposure, for any movement of galvanometer arm 18, these changes are always additive. Therefore, a change of one-half stop in each value, corresponding to a distance of one serration on vane 82, produces a combined exposure change of one full stop. The relation between shutter and diaphragm values is illustrated graphically in FIG. 7, wherein the axis of abcissas represents the useful range of light intensities or degrees of energization of the galvanometer.

The invention has been described in detail with particular reference to preferred embodiments thereof, but it will be understood that variations and modifications can be effected within the spirit and scope of the invention as described hereinabove and as defined in the appended claims.

I claim:

1. In a camera having a lens system for focusing an image of a viewed scene onto a photosensitive surface and having a multiple-speed shutter mechanism including means for setting the exposure time of said shutter mechanism; the combination comprising: a light-measuring instrument adapted to be differentially energized by scene light as a function of the intensity of said light; a diaphragm mechanism having a variable exposure aperture aligned with said lens system and comprising at least one sliding blade having a cam-shaped edge; first means controlled by said instrument and disposed in cooperative relation with said diaphragm mechanism for limiting the size of said aperture as a function of said intensity, said limiting means including a member differentially moved by said instrument relative to said cam-shaped edge for limiting the sliding movement of said blade as a function of the position of said member; means for sliding said blade into contact with said member; and second means controlled by said instrument and disposed in cooperative relation with said setting means to determine said exposure time as a function of said intensity.

2. The combination defined in claim 1, wherein said setting means includes a positionally adjustable member for setting said exposure time as a function of the position of said last-named member; drive means connected to said adjustable member for yieldably moving the latter; and a surface on said adjustable member coupled to said blade to differentially limit the movement of said adjustable member as a function of the position of said blade.

3. In a camera having means for focusing an image of a scene onto a photosensitive surface, a multiple-speed shutter mechanism including a first member movable within a range limited by first and second extreme positions for setting the exposure time of said shutter mechanism, prior to actuation thereof, as a function of the position of said first member; [and] a diaphragm mechanism with a variable aperture aligned with said focusing means for establishing an effective exposure aperture, said diaphragm mechanism including a second member movable within a range limited by first and second extreme positions for setting the size of said exposure aperture as a function of the position of said second member; *a light-measuring instrument adapted to be energized by scene light and having an element differentially positioned as a function of the intensity of said light; and a manually operable camera actuating device,* the combination comprising: means normally maintaining said first and second members in respective first extreme positions, each corresponding to the same extreme of exposure of said photosensitive surface; *means responsive to the operation of said camera actuating device for moving said first member toward its said second extreme position; means for limiting the movement of said second member is a function of the position of said element;* and means interrelating said first and second members, for moving *said second member toward its said second extreme position in response to the movement of said first member toward its said second extreme position, and for blocking further movement of said first member toward its said second extreme position whenever the movement of said second member is arrested by said element, thereby moving* both of said members toward their respective second extreme positions to respective positions jointly corresponding to a predetermined exposure of said photosensitive surface according to the brightness of said scene.

4. The combination defined in claim 3, wherein the first extreme positions of said first and second members correspond, respectively, to maximum shutter speed and minimum size of said exposure aperture.

5. The combination defined in claim 3, wherein the first extreme positions of said first and second members correspond, respectively, to minimum shutter speed and maximum size of said exposure aperture.

[6. The combination defined in claim 4, with: a photoelectric cell adapted for illumination by light from said scene; an electric measuring instrument connected to said cell and differentially energized thereby as a function of the brightness of said scene; and means interrelating said instrument and at least one of said first and second members for stopping the movement of said members at positions jointly corresponding to said predetermined exposure of said photosensitive surface according to scene brightness.]

[7. The combination defined in claim 3, wherein said interrelating means comprises a coupling between said first and second members for moving said members simultaneously.]

References Cited in the file of this patent or the original patent

UNITED STATES PATENTS

| | | |
|---|---|---|
| 2,058,531 | Tuttle | Oct. 27, 1936 |
| 2,076,481 | Riszdorfer | Apr. 6, 1937 |
| 2,418,370 | Simmon | Apr. 1, 1947 |
| 2,838,985 | Burger et al. | June 17, 1958 |
| 2,868,095 | Gebele | Jan. 13, 1959 |
| 2,887,026 | Rentschler | May 19, 1959 |
| 2,906,166 | Herterich | Sept. 29, 1959 |
| 2,913,969 | Faulhaber | Nov. 24, 1959 |
| 2,990,758 | Sauer et al. | July 4, 1961 |

FOREIGN PATENTS

| | | |
|---|---|---|
| 756,282 | Germany | Feb. 23, 1953 |